(12) United States Patent
Zhao et al.

(10) Patent No.: US 11,250,440 B2
(45) Date of Patent: Feb. 15, 2022

(54) PAYMENT COLLECTION DEVICE AND METHOD AND APPARATUS

(71) Applicant: ADVANCED NEW TECHNOLOGIES CO., LTD., Grand Cayman (KY)

(72) Inventors: Liansheng Zhao, Hangzhou (CN); An Li, Hangzhou (CN); Lei Jiao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/888,810

(22) Filed: May 31, 2020

(65) Prior Publication Data

US 2020/0294051 A1 Sep. 17, 2020

Related U.S. Application Data

(63) Continuation of application No. PCT/CN2019/077444, filed on Mar. 8, 2019.

(30) Foreign Application Priority Data

Jun. 4, 2018 (CN) .......................... 201810565043.2

(51) Int. Cl.
*G06Q 20/40* (2012.01)
*G06Q 20/32* (2012.01)

(52) U.S. Cl.
CPC ......... *G06Q 20/407* (2013.01); *G06Q 20/325* (2013.01); *G06Q 20/3274* (2013.01)

(58) Field of Classification Search
CPC .. G06Q 20/322; G06Q 20/3274; G06Q 20/20; G06Q 20/32; G06Q 20/401;

(Continued)

(56) References Cited

U.S. PATENT DOCUMENTS

| 8,104,679 B2 | 1/2012 | Brown |
| 8,939,356 B2 | 1/2015 | Pourfallah et al. |

(Continued)

FOREIGN PATENT DOCUMENTS

| CN | 103020818 A | 4/2013 |
| CN | 104574057 A | 4/2015 |

(Continued)

OTHER PUBLICATIONS

Gautam Garg, "QR Code Payments: Everything you need to know", Apr. 8, 2015, Scanova blog (Year: 2015).*

(Continued)

*Primary Examiner* — Christine M Behncke
*Assistant Examiner* — Henry H Jung

(57) ABSTRACT

Systems, methods, and storage media for payment collection are disclosed. An example method comprises: obtaining, at a code scanner, payment account information comprised in a payment code of a purchasing user by scanning the payment code; sending, at the code scanner, the payment account information to a processor; determining, at the processor, a payment amount due, to construct a payment request comprising the payment amount due, the payment account information, and the device identifier; sending, at the processor, the payment request to a communication module; and sending, at the communication module, the payment request to the target server for the target server to, according to the payment request, deduct the payment amount due from a payment account of the purchasing user corresponding to the payment account information, and add the payment amount due to the payment receiving account corresponding to the device identifier.

20 Claims, 8 Drawing Sheets

(58) Field of Classification Search
CPC .. G06Q 20/102; G06Q 20/3278; G06Q 20/18; G06Q 20/202; G06Q 20/40; G06Q 20/209; G06Q 20/327; G06Q 20/385; G06Q 20/4014; G06Q 20/204; G06Q 20/12; G06Q 20/367; G06Q 20/36; G06Q 30/0237; G06Q 20/3272; G06Q 20/3825; G06Q 20/363; G06Q 30/0215; G06Q 20/353; G06Q 30/0238; G07G 1/0009; G07G 1/0081; H04L 63/08; H04L 63/0428; H04L 2209/56; H04L 67/306; H04L 2209/80; H04W 4/80; H04W 12/06; H04W 88/02; H04W 12/00522; H04W 12/0609; H04W 4/24; H04W 12/00512; G06F 16/5846; G06F 21/606; G06F 21/35; G06F 21/36; G06F 21/445; G06K 7/1417; G06K 19/06037; G06K 19/06009; G06K 7/1413; G07F 7/08; B67D 7/0401

USPC ............................................. 705/21, 44, 75

See application file for complete search history.

(56) References Cited

U.S. PATENT DOCUMENTS

| | | | |
|---|---|---|---|
| 9,436,935 B2 | 9/2016 | Hudon | |
| 9,519,901 B1 | 12/2016 | Dorogusker | |
| 2004/0238629 A1 | 12/2004 | Buchholz | |
| 2006/0064349 A1* | 3/2006 | Multerer | G06Q 30/0236 705/14.35 |
| 2009/0234878 A1 | 9/2009 | Herz et al. | |
| 2011/0202465 A1* | 8/2011 | Mashhour | G06Q 20/3823 705/67 |
| 2012/0303425 A1 | 11/2012 | Katzin et al. | |
| 2013/0124306 A1* | 5/2013 | Hutchinson | G06Q 30/02 705/14.47 |
| 2013/0151419 A1* | 6/2013 | Hitchcock | G06Q 30/06 705/75 |
| 2014/0156531 A1 | 6/2014 | Poon et al. | |
| 2014/0351123 A1 | 11/2014 | Chava | |
| 2015/0058227 A1 | 2/2015 | Dua | |
| 2015/0095219 A1 | 4/2015 | Hurley | |
| 2015/0120573 A1 | 4/2015 | Xia | |
| 2015/0186994 A1* | 7/2015 | He | G06Q 20/4014 705/44 |
| 2015/0206128 A1* | 7/2015 | Torossian | G06Q 20/327 705/21 |
| 2015/0228004 A1 | 8/2015 | Bednarek et al. | |
| 2015/0294293 A1 | 10/2015 | Signarsson | |
| 2016/0180343 A1 | 6/2016 | Poon et al. | |
| 2016/0269394 A1* | 9/2016 | Zhong | H04W 48/14 |
| 2016/0321644 A1 | 11/2016 | Zeng et al. | |
| 2016/0337334 A1 | 11/2016 | Murr | |
| 2017/0032370 A1* | 2/2017 | Beltramino | G06Q 20/38215 |
| 2017/0262862 A1 | 9/2017 | Aljawhari | |
| 2018/0075441 A1 | 3/2018 | Tyler et al. | |
| 2018/0075442 A1 | 3/2018 | Tyler et al. | |
| 2018/0075453 A1 | 3/2018 | Durvasula et al. | |
| 2018/0117446 A1 | 5/2018 | Tran et al. | |
| 2018/0117447 A1 | 5/2018 | Tran et al. | |
| 2018/0121920 A1 | 5/2018 | Scipioni | |
| 2018/0288166 A1* | 10/2018 | Carlson | H04L 67/28 |
| 2019/0089774 A1* | 3/2019 | Prakash | G06F 21/629 |
| 2019/0122213 A1 | 4/2019 | Chen | |
| 2020/0051046 A1 | 2/2020 | Wang et al. | |
| 2020/0356830 A1* | 11/2020 | Qin | G06K 19/06028 |

FOREIGN PATENT DOCUMENTS

| | | | | |
|---|---|---|---|---|
| CN | 104599113 A | | 5/2015 | |
| CN | 104599113 A | * | 5/2015 | ......... G06Q 20/3274 |
| CN | 105931103 A | | 9/2016 | |
| CN | 105989463 A | | 10/2016 | |
| CN | 106096951 A | | 11/2016 | |
| CN | 106372892 A | | 2/2017 | |
| CN | 106779673 A | | 5/2017 | |
| CN | 107025548 A | * | 8/2017 | |
| CN | 107025548 A | | 8/2017 | |
| CN | 107067256 A | | 8/2017 | |
| CN | 107093275 A | | 8/2017 | |
| CN | 107274185 A | | 10/2017 | |
| CN | 107423974 A | | 12/2017 | |
| CN | 107609863 A | | 1/2018 | |
| CN | 108022138 A | | 5/2018 | |
| CN | 108053208 A | | 5/2018 | |
| CN | 108596294 A | * | 9/2018 | ....... G06K 19/06028 |
| CN | 109035636 A | | 12/2018 | |
| KR | 10-1780707 B1 | | 10/2017 | |
| WO | 2015/062255 A1 | | 5/2015 | |
| WO | 2015/145131 A1 | | 10/2015 | |

OTHER PUBLICATIONS

CRG cashregistergroup, "Casio se-s400 barcode scanner installation & connection—Do this operation first", Sep. 2, 2013, https://youtu.be/CxVTs1ASDLY (Year: 2013).*
Search Report dated Jun. 4, 2020, issued in related Taiwan Application No. 108106640 (1 page).
PCT International Search Report and the Written Opinion dated May 31, 2019, issued in related International Application No. PCT/CN2019/077444, with partial English translation (11 pages).
First Search dated Jan. 9, 2020, issued in related Chinese Application No. 201810565043.2 (2 pages).
First Office Action dated Jan. 17, 2020, issued in related Chinese Application No. 201810565043.2, with English machine translation (30 pages).
Second Office Action dated Mar. 30, 2020, issued in related Chinese Application No. 201810565043.2, with English machine translation (35 pages).
Supplementary Search dated Apr. 18, 2020, issued in related Chinese Application No. 201810565043.2 (1 page).
Search Report for European Application No. 19 815 912.1 dated Mar. 5, 2021.
International Preliminary Report on Patentability Chapter I for PCT Application No. PCT/CN2019/077444 dated Dec. 17, 2020.
Written Opinion for Singaporean Application No. 11202006323Q dated Jul. 28, 2021.
First Examination Report for Indian Application No. 202047029003 dated Aug. 26, 2021.

* cited by examiner

PAYMENT COLLECTION DEVICE AND METHOD AND APPARATUS

CROSS REFERENCE TO RELATED APPLICATIONS

The present application is a continuation application of PCT Application No. PCT/CN2019/077444 filed Mar. 8, 2019, which is based on and claims priority to Chinese Patent Application No. 201810565043.2, filed on Jun. 4, 2018. All of the above-identified applications are incorporated herein by reference in their entirety.

TECHNICAL FIELD

Embodiments of the specification relate to the field of information technologies, and in particular, to a payment collection device, method, and apparatus.

BACKGROUND

With the development of the mobile payment technology, solutions for implementing fast payment based on bar codes (such as one-dimensional code, two-dimensional code, etc.) are gradually becoming popular.

At present, there are code scanning devices (such as code scanning gun and code scanning box) in the market that are dedicated to merchant payment collection. A merchant may scan a payment code (that is, a bar code corresponding to a payment account of a purchasing user) provided by a purchasing user using the code scanning device to collect the payment. FIG. 1 shows a schematic diagram of a merchant collecting a payment using a code scanning box.

As shown in FIG. 1, an existing code scanning box needs to be connected to a settlement device (such as a cash register) of the merchant for use, and the merchant often registers a payment receiving account on a server of an intermediate service provider (referred to as an intermediate server), and the intermediate server manages the payment receiving account. When the merchant needs to collect payment, on the one hand, the merchant inputs a payment amount to be collected into the payment collection device, and on the other hand, the purchasing user is required to show, to the code scanning box, a payment code (for example, a two-dimensional code) corresponding to a payment account of the purchasing user. The payment account of the purchasing user is registered on a server (referred to as a payment server) of a payment service provider, and the payment server manages the payment account.

Next, the settlement device of the merchant scans the two-dimensional code shown by the purchasing user through the code scanning box to obtain payment account information of the purchasing user, and then sends, to the intermediate server, the payment account information, the payment amount to be collected, and the payment receiving account information of the payment receiving account of the merchant, and the intermediate server and the payment server are connected. In particular, the intermediate server sends, to the payment server, the payment account information and the payment amount to be collected; and the payment server deducts, from the payment account of the purchasing user, the payment amount to be collected, and pays, to the intermediate server, the payment amount to be collected. Afterwards, the intermediate server adds, to the payment receiving account (that is, the payment receiving account of the merchant) corresponding to the payment receiving account information, the payment amount to be collected. As such, the payment amount due to the merchant is collected.

Based on existing technologies, a payment collection device is needed to improve payment collection efficiency of the merchant.

SUMMARY

In order to improve the payment collection efficiency of the merchant, embodiments of the specification provide a payment collection device, method, and apparatus. Technical solutions are shown as below:

In some embodiments, a payment collection device is provided, where the target server stores an association relationship between a device identifier of the payment collection device and a payment receiving account of a merchant, the payment receiving account being managed by the target server.

The payment collection device includes: a code scanner, a processor, and a communication module. The code scanner scans a payment code provided by a purchasing user to obtain payment account information contained in the payment code, and sends the payment account information to the processor. A payment account corresponding to the payment account information is managed by the target server. The processor determines a payment amount to be collected, constructs a payment request containing the payment amount to be collected, the payment account information, and the device identifier, and sends the payment request to the communication module. The communication module sends the payment request to the target server for the target server to, according to the payment request, deduct, from the payment account corresponding to the payment account information, the payment amount to be collected, and add, to the payment receiving account associated with the device identifier, the payment amount to be collected.

In some embodiments, a payment collection method applied to the foregoing payment collection device is provided, the target server storing an association relationship between a device identifier of the payment collection device and a payment receiving account of a merchant, the payment receiving account being managed by the target server, and the method includes: acquiring, by the payment collection device, a payment amount to be collected; scanning, by the payment collection device, a payment code provided by the purchasing user, to obtain payment account information contained in the payment code, a payment account corresponding to the payment account information being managed by the target server; constructing, by the payment collection device, a payment collection request containing the payment amount to be collected, the payment account information, and the device identifier; sending, by the payment collection device, the payment collection request to the target server; and deducting, by the target server according to the payment collection request, from the payment account corresponding to the payment account information, the payment amount to be collected, and adding, to a payment receiving account associated with the device identifier, the payment amount to be collected.

In some embodiments, a payment collection system is provided, including the foregoing payment collection device and target server.

The target server stores an association relationship between a device identifier of the payment collection device and a payment receiving account of the merchant, the payment receiving account being managed by the target server.

The payment collection device acquires a payment amount to be collected; scans a payment code provided by a purchasing user, to obtain payment account information contained in the payment code, a payment account corresponding to the payment account information being managed by the target server; constructs a payment collection request containing the payment amount to be collected, the payment account information, and the device identifier; and sends the payment collection request to the target server.

According to the payment collection request, the target server deducts, from the payment account corresponding to the payment account information, the payment amount to be collected, and adds, to the payment receiving account associated with the device identifier, the payment amount to be collected.

In some embodiments, a device binding method applied to the foregoing payment collection device is provided, and the method includes: scanning, by the payment collection device, a configuration code that is provided by a merchant and that contains payment receiving account information corresponding to a payment receiving account of the merchant, to obtain the payment receiving account information, the payment receiving account being managed by the target server; constructing, by the payment collection device, a device binding request containing the payment receiving account information and the device identifier; sending, by the payment collection device, the device binding request to the target server; and establishing, by the target server, an association relationship between the payment receiving account information and the device identifier and stores the association relationship.

In some embodiments, a device binding system is provided, including the foregoing payment collection device and target server.

The payment collection device scans a configuration code that is provided by a merchant and that contains payment receiving account information corresponding to a payment receiving account of the merchant, to obtain the payment receiving account information, the payment receiving account being managed by the target server; constructs a device binding request containing the payment collection information and the device identifier; and sends the device binding request to the target server.

The target server establishes an association relationship between the payment receiving account information and the device identifier and stores the association relationship.

In some embodiments, a payment collection device comprises: a processor, a code scanner coupled to the processor, and a communication module coupled to the processor. The code scanner is configured to obtain payment receiving account information corresponding to a payment receiving account of a seller by scanning a configuration code of the seller, and to send the payment receiving account information to the processor, the configuration code comprising the payment receiving account information. The processor is configured to construct a device binding request comprising the payment receiving account information and a device identifier of the payment collection device, and to send the device binding request to the communication module. The communication module is configured to send the device binding request to a target server, for the target server to establish and store an association relationship between the device identifier and the payment receiving account information. The code scanner is configured to obtain payment account information comprised in a payment code of a purchasing user by scanning the payment code, and to send the payment account information to the processor. The processor is configured to determine a payment amount due, to construct a payment request comprising the payment amount due, the payment account information, and the device identifier, and to send the payment request to the communication module. The communication module is configured to send the payment request to the target server for the target server to, according to the payment request, deduct the payment amount due from a payment account of the purchasing user corresponding to the payment account information, and add the payment amount due to the payment receiving account corresponding to the device identifier.

In one embodiment, the communication module comprises a WI-FI module, the configuration code further comprises WI-FI hotspot information, the code scanner is configured to obtain the WI-FI hotspot information and send the WI-FI hotspot information to the WI-FI module, and the WI-FI module is configured to connect to a WI-FI hotspot corresponding to the WI-FI hotspot information according to the WI-FI hotspot information, for communication with the target server through the WI-FI hotspot.

In one embodiment, the payment collection device further comprises an information input module configured to receive the payment amount due input by the seller, and to send the payment amount due to the processor.

In one embodiment, the code scanner is configured to obtain merchandise information of a merchandise purchased with the payment amount by scanning a merchandise code that comprises the merchandise information, and to send the merchandise information to the processor; the processor is configured to construct a merchandise price query request comprising the merchandise information, and to send the merchandise price query request to the communication module; and the communication module is configured to send the merchandise price query request to the target server, to receive from the target server a merchandise price corresponding to the merchandise information, and to send the merchandise price to the processor as the payment amount due.

In one embodiment, the code scanner is configured to obtain a payment record identifier comprised in a payment record identification code of the purchasing user by scanning the payment record identification code, and to send the payment record identifier to the processor; the payment record identification code is generated by the target server and issued to the purchasing user according to a payment record after the target server generates the payment record according to the payment request; the processor is configured to construct a refund request comprising the payment record identifier, and to send the refund request to the communication module; and the communication module is configured to send the refund request to the target server, for the target server to determine, according to the refund request, the payment receiving account, the payment account, and the payment amount due in the payment record corresponding to the payment record identifier, deduct the payment amount due from the payment receiving account, and add the payment amount due to the payment account.

In one embodiment, the code scanner is configured to obtain a payment record identifier comprised in a payment record identification code of the purchasing user by scanning the payment record identification code, and to send the payment record identifier to the processor; the payment record identification code is generated by the target server and issued to the purchasing user according to a payment record after the target server generates the payment record according to the payment request; the processor is configured to construct a payment record query request comprising the payment record identifier, and to send the payment record query request to the communication module; and the communication module is configured to send the payment record query request to the target server, for the target server to return the payment record corresponding to the payment record identifier according to the payment record query request.

In one embodiment, the payment collection device further comprises: a security element configured to encrypt and sign information sent to the target server.

In one embodiment, the payment collection device further comprises: an audio output module; the processor is configured to determine an audio message according to a preset rule, and to send the audio message to the audio output module; and the audio output module is configured to play the audio message.

In some embodiments, a non-transitory computer-readable storage medium stores instructions executable by a processor, wherein execution of the instructions causes the processor to perform operations comprising: obtaining, at a code scanner, payment receiving account information corresponding to a payment receiving account of a seller by scanning a configuration code of the seller; sending, at the code scanner, the payment receiving account information to the processor, the configuration code comprising the payment receiving account information; constructing, at the processor, a device binding request comprising the payment receiving account information and a device identifier of the payment collection device; sending, at the processor, the device binding request to a communication module; sending, at the communication module, the device binding request to a target server, for the target server to establish and store an association relationship between the device identifier and the payment receiving account information; obtaining, at the code scanner, payment account information comprised in a payment code of a purchasing user by scanning the payment code; sending, at the code scanner, the payment account information to the processor; determining, at the processor, a payment amount due, to construct a payment request comprising the payment amount due, the payment account information, and the device identifier; sending, at the processor, the payment request to the communication module; and sending, at the communication module, the payment request to the target server for the target server to, according to the payment request, deduct the payment amount due from a payment account of the purchasing user corresponding to the payment account information, and add the payment amount due to the payment receiving account corresponding to the device identifier.

In some embodiments, a method comprises: obtaining, at a code scanner, payment receiving account information corresponding to a payment receiving account of a seller by scanning a configuration code of the seller; sending, at the code scanner, the payment receiving account information to a processor, the configuration code comprising the payment receiving account information; constructing, at the processor, a device binding request comprising the payment receiving account information and a device identifier of the payment collection device; sending, at the processor, the device binding request to a communication module; sending, at the communication module, the device binding request to a target server, for the target server to establish and store an association relationship between the device identifier and the payment receiving account information; obtaining, at the code scanner, payment account information comprised in a payment code of a purchasing user by scanning the payment code; sending, at the code scanner, the payment account information to the processor; determining, at the processor, a payment amount due, to construct a payment request comprising the payment amount due, the payment account information, and the device identifier; sending, at the processor, the payment request to the communication module; and sending, at the communication module, the payment request to the target server for the target server to, according to the payment request, deduct the payment amount due from a payment account of the purchasing user corresponding to the payment account information, and add the payment amount due to the payment receiving account corresponding to the device identifier.

Embodiments disclosed herein have one or more technical effects. Both a payment receiving account of a merchant and a payment account of a purchasing user are managed by a target server. The payment receiving account of the merchant is "bound" to the payment collection device (that is, the target server stores an association relationship between a device identifier of a payment collection device and the payment receiving account of a merchant). When a payment needs to be collected, a payment amount to be collected is acquired by the payment collection device, or the payment collection device may scan a payment code provided by the purchasing user so as to acquire payment account information contained in the payment code. Next, a payment collection request is constructed by the payment collection device according to the payment account information, the payment amount to be collected, and a device identifier of the payment collection device, and the payment collection request is sent to the target server via a direct link. Therefore, the target server deducts, from the payment account of the purchasing user, the payment amount to be collected, and adds, to the payment receiving account of the merchant, the payment amount to be collected. Through the embodiments of the specification, an intermediate server is not required to participate in an entire payment collection process. The payment receiving account of the merchant may be directly managed by a payment server. After the payment collection device is bound to the payment receiving account of the merchant, the payment collection device may directly interact with the payment server to complete the payment collection. In this manner, a data link corresponding to the payment collection process is simplified, and payment collection efficiency of the merchant is improved.

It should be understood that the foregoing general description and detailed description in the following are used for merely exemplary and interpretive, but cannot constitute a limitation to the embodiments of the present application. In addition, any of the embodiments of the present application does not need to achieve all the effects described above.

BRIEF DESCRIPTION OF THE DRAWINGS

To describe the technical solutions in the embodiments of the present application or in the existing technologies more clearly, the following briefly describes the accompanying drawings required for describing the embodiments or the existing technologies. Apparently, the accompanying drawings in the following description show merely some of the embodiments of the present application, and persons of ordinary skill in the art may still derive other drawings from these accompanying drawings.

DETAILED DESCRIPTION OF THE INVENTION

Figure 1:
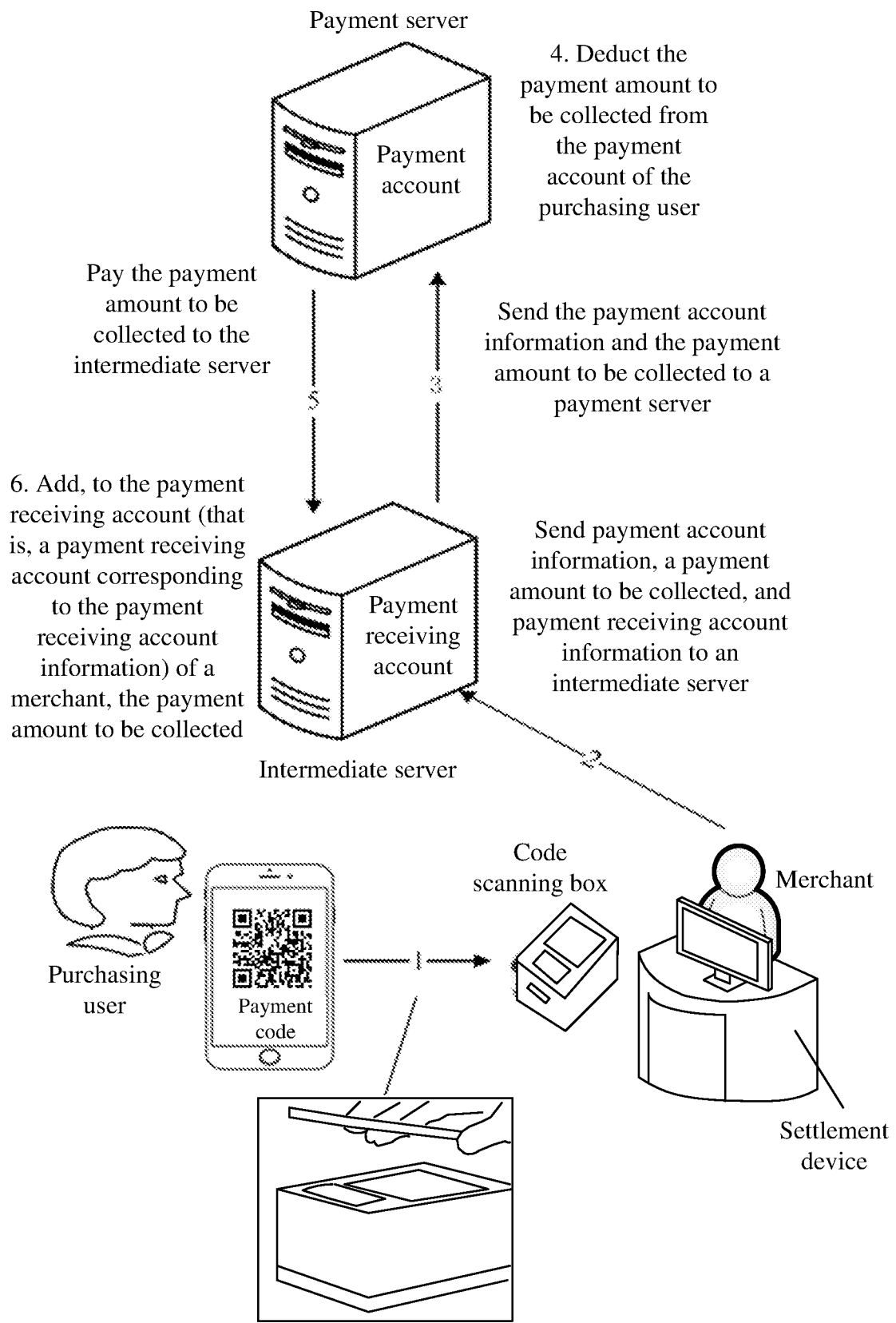
FIG. 1 is a schematic scene diagram of an existing payment collection method.

An existing code scanning device and a payment collection method using such code scanning device are characterized as below.

1. The existing code scanning device is actually just a tool for code scanning and has a single function, and needs to be connected to a settlement device (such as a cash register) of a merchant, and transmit code information obtained by scanning a bar code to the settlement device, and then the settlement device initiates a payment collection request.

2. In an existing payment collection method, the merchant has a cooperative relationship with an intermediate service provider, and the merchant registers a payment receiving account on an intermediate server, and the payment receiving account is managed by the intermediate server. However, a payment account of a purchasing user is usually registered on a payment server and managed by the payment server. A payment code used by the purchasing user for payment is usually generated by a client that corresponds to the payment server and that is installed on a device of the purchasing user. That is to say, for a single payment collection, the payment account and the payment receiving account are not managed by the same server.

In practice, the intermediate server usually acts as a payment collection agent to facilitate a single payment collection. In particular, on the one hand, the intermediate server is connected to a settlement device of the merchant to obtain, from the settlement device, a payment amount to be collected and payment account information corresponding to the payment account of the purchasing user, on the other hand, the intermediate service is connected to the payment server so as to send the acquired payment account information to the payment server, request the payment server to deduct, from the payment account of the purchasing user, an amount due, and request the payment server to pay the amount due to the intermediate server. Finally, the intermediate server adds, to the payment receiving account of the merchant managed by the intermediate server, the deducted amount paid by the payment server.

In the existing technologies, a data link corresponding to a payment collection process is: code scanning device—merchant settlement device—intermediate server—payment server—intermediate server. Obviously, because the data link involves too many steps, if a time point of scanning, using the code scanning device, a payment code provided by the purchasing user is a beginning of a single payment collection process, the wait time for the merchant to collect a single payment amount due is relatively long, and the wait time for the purchasing user to receive an amount deduction notice (an amount deduction notice issued by the payment server to a client installed on a device of the purchasing user) issued by the payment server is also relatively long.

That is to say, there are problems of a low payment collection efficiency and poor user experience for the existing code scanning device and the payment collection method based on such code scanning device.

Accordingly, in the present application, the existing code scanning device is improved to obtain a payment collection device. The payment collection device has functions of data processing and communication as well as code scanning. The payment collection device may be an Internet of Things terminal. In this way, the payment collection device may work independently without a need to be connected to the settlement device of the merchant. In addition, the payment receiving account of the merchant and the payment account of the purchasing user are managed by a target server. If the payment collection device is bound to the payment receiving account of the merchant, the data collection device may directly exchange data with the target server to implement an entire payment collection process, simplifying the data link and effectively improving the payment collection efficiency.

Information included in a bar code herein refers to information represented by the bar code. In addition, bar codes containing different pieces of information are referred to by different names, such as payment code, configuration code, and merchandise code, etc.

In order to enable a person skilled in the art to better understand technical solutions in embodiments of the specification, the technical solutions in the embodiments of the specification are described in detail below with reference to the drawings in the embodiments of the specification. The described embodiments are only a part of the embodiments of the specification, rather than all of the embodiments. Based on the embodiments in the specification, all other embodiments obtained by a person skilled in the art should fall within the protection scope.

The technical solutions provided in the embodiments of the specification are described in detail below with reference to the drawings.

Figure 2:
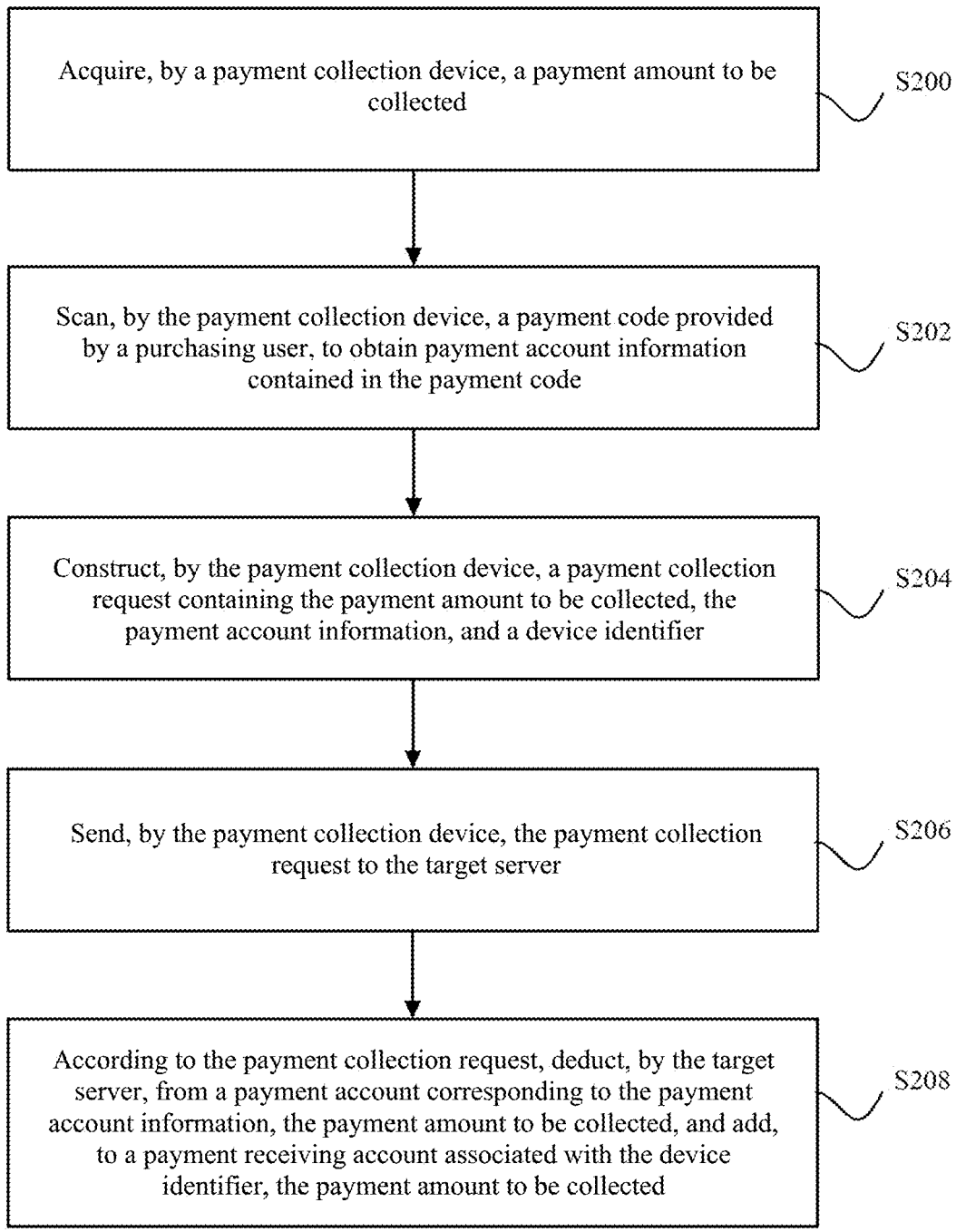
FIG. 2 is a schematic flowchart of a payment collection method, according to an embodiment of the specification.

FIG. 2 is a schematic flowchart of a payment collection method, according to an embodiment of the specification. The payment collection method includes steps below:

S200: A payment collection device acquires a payment amount to be collected.

The payment collection device is a new type of Internet of Things terminal provided by the present application. The payment collection device has functions of code scanning, data processing, and communication, and may be in independent communication with a payment server to collect payment. A structure of the payment collection device is described in detail later.

In the payment collection process, a server device responsible for data interaction with the payment collection device to complete payment collection is referred to as a target server. The target server is usually a payment server, which is a server responsible for managing a payment receiving account of a merchant and managing a payment account of a purchasing user. For example, the target server may be an Alipay™ server. Both the merchant and the purchasing user register accounts on the Alipay™ server. An account registered by the merchant is referred to as a payment receiving account, and an account registered by the purchasing user is referred to as a payment account.

In an embodiment of the specification, the target server stores an association relationship between a device identifier of the payment collection device and a payment receiving account of the merchant. This means that the payment collection device is bound to the payment receiving account of the merchant, and payment collected by the payment collection device flows into the payment receiving account of the merchant.

In a practical application, the merchant needs to bind the payment collection device to the payment receiving account of the merchant before using the payment collection device to collect payment.

In particular, the payment collection device may scan a configuration code that is provided by the merchant and that contains payment receiving account information corresponding to the payment receiving account of the merchant, to obtain the payment receiving account information, and then construct a device binding request containing the payment receiving account information and the device identifier, and send the device binding request to the target server. The target server establishes an association relationship between the payment receiving account information and the device identifier and stores the association relationship.

In the practical application, the merchant may install a client corresponding to the target server on a device such as a mobile phone, a computer, or the like of the merchant, and log in to the payment receiving account of the merchant in the client. The client may generate a configuration code containing the payment receiving account information corresponding to the payment receiving account and provide the payment receiving account information to the merchant.

In the embodiment of the specification, the payment collection device acquires the payment amount to be collected in a plurality of manners, for example, the payment collection device may receive the payment amount to be collected input by the merchant.

For another example, the payment collection device may scan a merchandise code corresponding to a to-be-paid merchandise to obtain merchandise information contained in the merchandise code, construct a merchandise price query request of the merchandise information, and send the merchandise price query request to the target server. The target server returns the merchandise price, as the payment amount to be collected, corresponding to the merchandise information to the payment collection device.

S202: The payment collection device scans a payment code provided by the purchasing user to obtain payment account information contained in the payment code. In some embodiments, the code scanner is configured to obtain payment account information comprised in a payment code of a purchasing user by scanning the payment code, and to send the payment account information to the processor.

As previously described, a payment account corresponding to the payment account information is also managed by the target server. In a practical application, the purchasing user may install a client corresponding to the target server on a device such as mobile phone, computer, etc. of the purchasing user, and log in to the payment account of the purchasing user in the client. The client may generate a payment code contained in the payment account information corresponding to the payment account and provide the payment code to the purchasing user. The purchasing user may use the payment code to perform a payment.

In the existing technologies, there is one payment manner that the merchant collects payment by posting a "payment collection code" at a business premise. The "payment collection code" is generated by the target server according to the payment receiving account information corresponding to the payment receiving account of the merchant. For example, when the purchasing user is performing payment, the purchasing user needs to operate the client installed on the device of the purchasing user to scan the "payment collection code" so as to obtain the payment receiving account information, and input the payment amount, and send, to the target server, the payment receiving account information and the payment amount for payment. In this manner, the purchasing user actively scans the "payment collection code" for payment, and the merchant passively completes the payment, which is relatively inconvenient for the purchasing user.

In an embodiment of the specification, the payment receiving account information of the merchant is bound to the payment collection device. The purchasing user only needs to show a payment code of the purchasing user when performing a payment, which is more convenient for the purchasing user.

S204: The payment collection device constructs a payment collection request containing the payment amount to be collected, the payment account information, and the device identifier.

S206: The payment collection device sends the payment collection request to the target server. In some embodiments, the processor is configured to determine a payment amount due, to construct a payment request comprising the payment amount due, the payment account information, and the device identifier, and to send the payment request to the communication module.

S208: According to the payment collection request, the target server deducts, from the payment account corresponding to the payment account information, the payment amount to be collected, and adds, to the payment receiving account associated with the device identifier, the payment amount to be collected. In some embodiments, the communication module is configured to send the payment request to the target server for the target server to, according to the payment request, deduct the payment amount due from a payment account of the purchasing user corresponding to the payment account information, and add the payment amount due to the payment receiving account corresponding to the device identifier.

Because the target server stores an association relationship between the device identifier of the payment collection device and the payment account, when collecting the payment, the payment collection device needs to carry the device identifier of the payment collection device in the payment collection request sent to the target server. Therefore, the target server may determine the payment collection device that executes this payment collection and the payment receiving account involved in this payment collection.

After the target server determines the payment amount to be collected, the payment account, and the payment receiving account, the target server may perform a deduction on the payment account and a payment to the payment receiving account, and so far, the merchant completes the payment.

Figure 3:
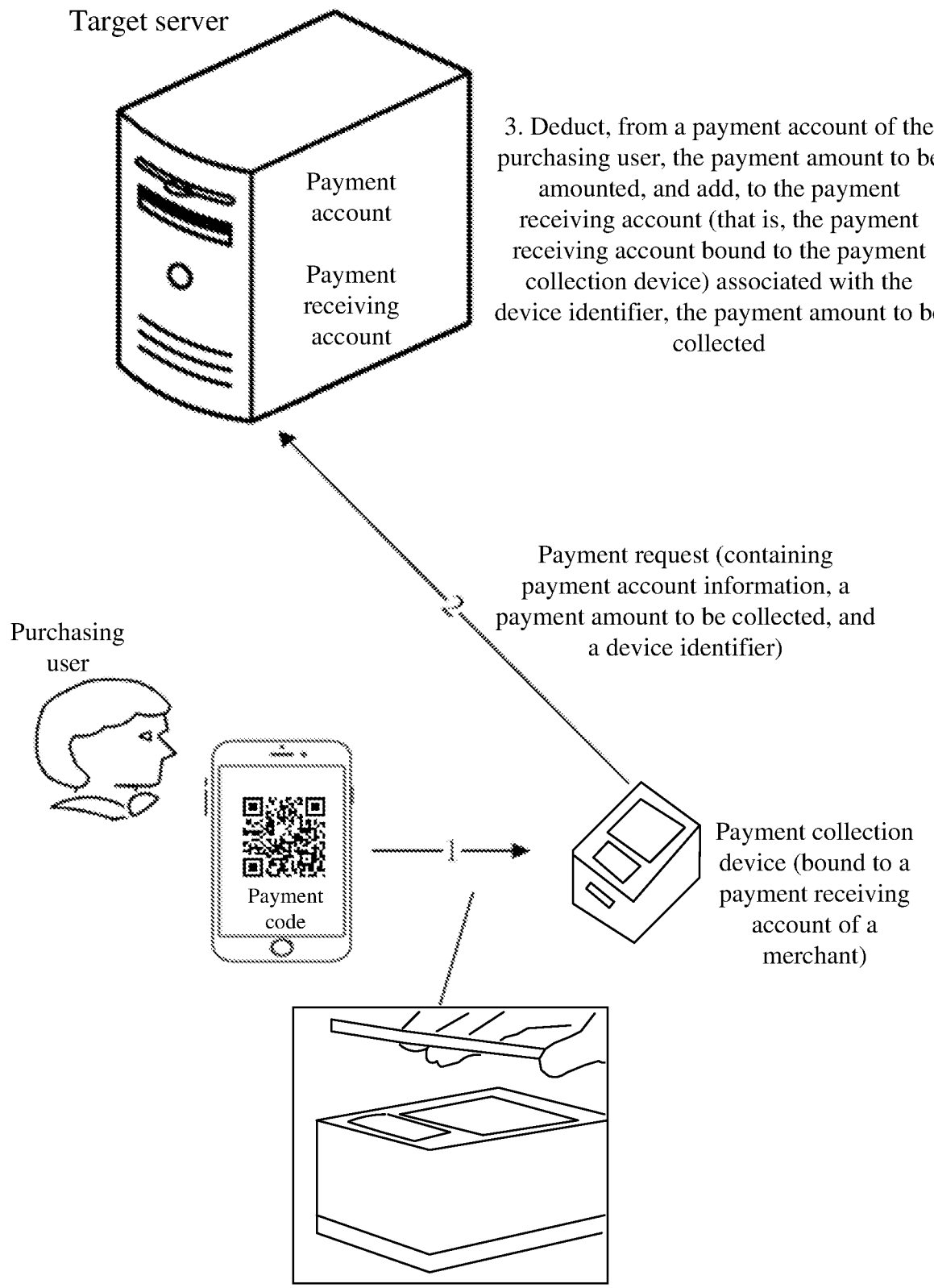
FIG. 3 is a schematic scene diagram of a payment collection method, according to an embodiment of the specification.

FIG. 3 is a schematic scene diagram of a payment collection method, according to an embodiment of the specification. As shown in FIG. 3, a data link corresponding to a payment collection process is: payment collection device-target server. That is to say, an intermediate server is not required to participate in an entire payment collection process. The payment receiving account of a merchant may be directly managed by a payment server. After a payment collection device is bound to the payment receiving account of the merchant, the payment collection device may directly interact with the payment server to complete the payment collection. In this manner, a data link corresponding to the payment collection process is simplified, and payment collection efficiency of the merchant is improved.

In addition, in consideration of a data security issue when the payment collection device performs data interaction with the target server, the payment collection device may encrypt the payment collection request before sending the payment collection request to the target server. The target server needs to decrypt the payment collection request, before deducting, from the payment account corresponding to the payment account information, the payment amount to be collected.

In addition, in a practical application, the payment collection device, as an IoT terminal registered on the target server, further stores a public key of each payment collection device for verifying whether the received payment collection request is sent by a registered payment collection device. A payment collection request is legal if it is sent by the registered payment collection device. In particular, the payment collection device may sign the payment collection request (signing with a private key of the payment collection device) before sending the payment collection request, for the target server to verify the signature (verifying the signature using the public key of the payment collection device), and determine that the verification succeeds before performing deduction, to determine that the payment collection request is legal.

Further, in a practical application, the payment collection device may not only collect a payment, but also perform payment record query and refund.

In particular, the target server may generate a payment record according to each received payment collection request. The payment account information, payment receiving account information, and payment amount to be collected that are involved in the current payment collection are recorded in the payment record. The target server may generate, according to the payment record, a payment record identification code containing a payment record identifier, and issue the payment record identification code to the purchasing user (specifically, issuing to a client installed on a device of the purchasing user).

In this way, the purchasing user may use the payment record identification code and the payment collection device to perform payment record query and refund.

In particular, refund is performed below: the payment collection device may scan the payment record identification code provided by the purchasing user, to obtain the payment record identifier contained in the payment record identification code; construct a refund request containing the payment record identifier; and send the payment refund request to the target server. The target server determines, according to the refund request, a payment receiving account, a payment account, and a payment amount to be collected in a payment record corresponding to the payment record identifier, deducts, from the payment receiving account, the payment amount to be collected, and adds, to the payment receiving account, the payment amount to be collected.

In particular, the payment record query is performed below: scanning the payment record identification code provided by the purchasing user, to obtain the payment record identifier contained in the payment record identification code; constructing a payment record query request containing the payment record identifier; and sending the payment record query request to the target server. The target server returns the payment record corresponding to the payment record identifier to the payment collection device according to the payment record query request.

Further, it may be required that the purchasing user needs to obtain a consent of the merchant when initiating the refund and payment record query. After the merchant agrees to the buyer for performing the refund or payment record query, the merchant may input an instruction (a refund instruction or payment record query instruction) into the payment collection device. The payment collection device switches to a refund mode or query mode after receiving the instruction. The refund mode refers to that the payment collection device automatically constructs and sends a refund request according to an obtained payment record identifier through scanning The query mode refers to that the payment collection device automatically constructs and sends a payment record query request according to the obtained payment record identifier through scanning If the payment collection device does not receive the instruction, the payment collection device keeps in a default payment collection mode, that is, automatically constructing the payment collection request according to obtained payment account information through scanning.

In addition, in an embodiment of the specification, the merchant may release a binding relationship between a payment receiving account of the merchant and the payment collection device. The merchant may send a device unbinding instruction to the target server. The target server may delete the stored association relationship according to the device unbinding instruction.

Further, the merchant may send the device unbinding instruction to the target server through the client that corresponds to the target server and that is installed on the device of the merchant.

Figure 4:
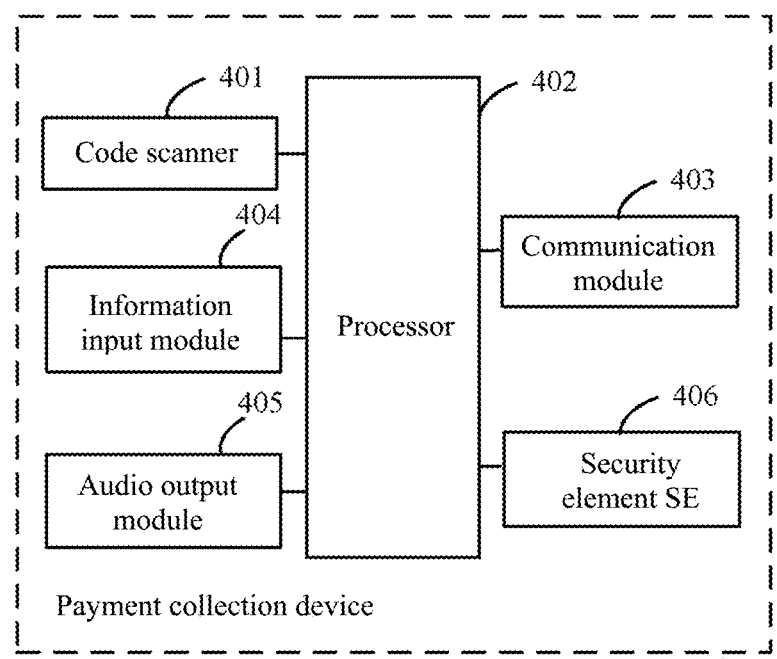
FIG. 4 is a schematic structural diagram of a payment collection device, according to an embodiment of the specification.

FIG. 4 is a schematic structural diagram of a payment collection device (participating in performing the payment collection method shown in FIG. 2), according to an embodiment of the specification, including: a code scanner 401, a processor 402, and a communication module 403.

The code scanner 401 scans a payment code provided by a purchasing user to obtain payment account information contained in the payment code and sends the payment account information to the processor. A payment account corresponding to the payment account information is managed by a target server.

The processor 402 determines a payment amount to be collected, constructs a payment request containing the payment amount to be collected, the payment account information, and the device identifier, and sends the payment request to the communication module.

The communication module 403 sends the payment request to the target server for the target server to, according to the payment request, deduct, from the payment account corresponding to the payment account information, the payment amount to be collected, and add, to the payment receiving account associated with the device identifier, the payment amount to be collected.

The code scanner 401 is a machine that reads information contained in a bar code. The code scanner usually consists of a camera and a decoding chip. The camera is responsible for scanning the bar code, and the decoding chip is responsible for determining information contained in the bar code. The information contained in the bar code herein is actually information represented by the bar code.

Further, the code scanner 401 scans a configuration code that is provided by a merchant and that contains payment receiving account information corresponding to the payment receiving account of the merchant before scanning the payment code, to obtain the payment receiving account information, and sends the payment receiving account information to the processor 402.

The processor 402 constructs a device binding request containing the payment receiving account information and the device identifier before constructing the payment request, and sends a registration request to the communication module.

The communication module 403 sends the device binding request to the target server before sending the payment request, for the target server to establish an association relationship between the device identifier and the payment receiving account information and store the association relationship.

In an embodiment of the specification, the communication module may be a cellular communication module, such as a communication module supporting a 2G, 3G, 4G, or 5G standard. The communication module may also be a non-cellular communication module, such as a WIFI module and a Bluetooth module.

In particular, when the communication module 403 is a wireless WI-FI module, the configuration code further includes: WI-FI hotspot information.

The code scanner 401 obtains the WI-FI hotspot information in advance, and sends the WI-FI hotspot information to the WI-FI module.

The WI-FI module is connected to a WI-FI hotspot corresponding to the WI-FI hotspot information in advance according to WI-FI hotspot information, for communication with the target server through the WI-FI hotspot.

The WI-FI hotspot information may be an identification (e.g., Service Set Identifier SSID) and a password of the WI-FI hotspot. In practice, a connection network of the payment collection device is configured.

When the communication module 403 is a cellular communication module, the communication module may be automatically connected to a network of a communication operator, that is, the network of the payment connection device is not required to be configured.

Further, the payment collection device further includes: an information input module 404 receiving the payment amount to be collected input by the merchant, and sending, to the processor, the payment amount to be collected.

In a practical application, the information input module of the payment collection device may be connected to an information input device such as a keyboard and a microphone. Taking the keyboard as an example, the merchant may input a payment amount to be collected on the keyboard, and the keyboard transmits the payment amount to be collected to the information input module.

Further, the code scanner 401 scans a merchandise code containing merchandise information corresponding to a to-be-paid merchandise, to obtain the merchandise information and send the merchandise information to the processor.

The processor 402 constructs a merchandise price query request containing the merchandise information, and sends the merchandise price query request to the communication module.

The communication module 403 sends the merchandise price query request to the target server, for the target server to return a merchandise price corresponding to the merchandise information; and sends the merchandise price to the processor as the payment amount to be collected.

Further, the code scanner 401 scans a payment record identification code provided by the purchasing user, to obtain a payment record identifier contained in the payment record identification code, and sends the payment record identifier to the processor, the payment record identification code being generated by the target server and issued to the purchasing user according to a payment record after the target server generates the payment record according to the payment request.

The processor 402 constructs a refund request containing the payment record identifier, and sends the refund request to the communication module.

The communication module 403 sends the refund request to the target server, for the target server to determine, according to the refund request, a payment receiving account, a payment account, and a payment amount to be collected in the payment record corresponding to the payment record identifier, deduct, from the payment receiving account, the payment amount to be collected, and add, to the payment account, the payment amount to be collected.

Further, the code scanner 401 scans a payment record identification code provided by the purchasing user, to obtain a payment record identifier contained in the payment record identification code, and send the payment record identifier to the processor, the payment record identification code being generated by the target server and issued to the purchasing user according to a payment record after the target server generates the payment record according to the payment request.

The processor 402 constructs a payment record query request containing the payment record identifier, and sends the payment record query request to the communication module.

The communication module 403 sends the payment record query request to the target server, for the target server to return the payment record corresponding to the payment record identifier according to the payment record query request.

Further, the payment collection device further includes: a security element 406 configured to encrypt and/or sign information sent to the target server.

All information sent by a wireless communication module to the target server may be encrypted and/or signed, and some information (such as a payment collection request) sent by the wireless communication module to the target server may be encrypted and/or signed.

Further, the payment collection device further includes: an audio output module 405.

The processor 402 determines an audio message according to a preset business rule, and sends the audio message to the audio output module.

The audio output module 405 plays the audio message.

In a practical application, the business rule may be specified according to business needs. For example, for a payment collection, if a payment code of a purchasing user is scanned successfully, the processor may determine that the audio message is "scanned successfully," and the audio output module 405 plays the audio message to prompt the user that the code of the purchasing user is scanned successfully. If the payment code of the purchasing buyer user is scanned unsuccessfully, the processor may determine that the audio message is "scanned unsuccessfully," and the audio output module 405 plays the audio message to prompt the user that the code of the purchasing user is scanned unsuccessfully.

For another example, for a payment collection, after the target server performs the deduction and payment, it means that the merchant collects payment successfully. In this case, the target server may issue a notification of successful payment collection to the payment collection device, the communication module of the payment collection device sends the received notification to the processor, and the processor hereby determines the audio message that "the payment amount to be collected is collected," and sends the audio message to the audio output module 405 for being played, to prompt the merchant that the payment amount to be collected is collected successfully.

In a practical application, the payment collection device may record various operations performed by the payment collection device and generate a log file. The target server may acquire a log file of the payment collection device, to help a technician perform routine maintenance on the payment collection device. The target server may also issue some control instructions to the payment collection device to achieve remote control of the payment collection device. For example, the target server may use over-the-air technology (OTA) to upgrade firmware of the payment collection device.

In some embodiments, the various modules in FIG. 4 may be implemented as software instructions or a combination of software and hardware. For example, payment collection device in FIG. 7 (or referred to as a system) may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules described herein (e.g., with reference to the method embodiments).

In some embodiments, the payment collection device includes a code scanner, a processor, and a communication module. The code scanner scans a payment code provided by a purchasing user to obtain payment account information contained in the payment code, and sends the payment account information to the processor. A payment account corresponding to the payment account information is managed by the target server. The processor determines a payment amount to be collected, constructs a payment request containing the payment amount to be collected, the payment account information, and the device identifier, and sends the payment request to the communication module. The communication module sends the payment request to the target server for the target server to, according to the payment request, deduct, from the payment account corresponding to the payment account information, the payment amount to be collected, and add, to the payment receiving account associated with the device identifier, the payment amount to be collected.

Figure 5:
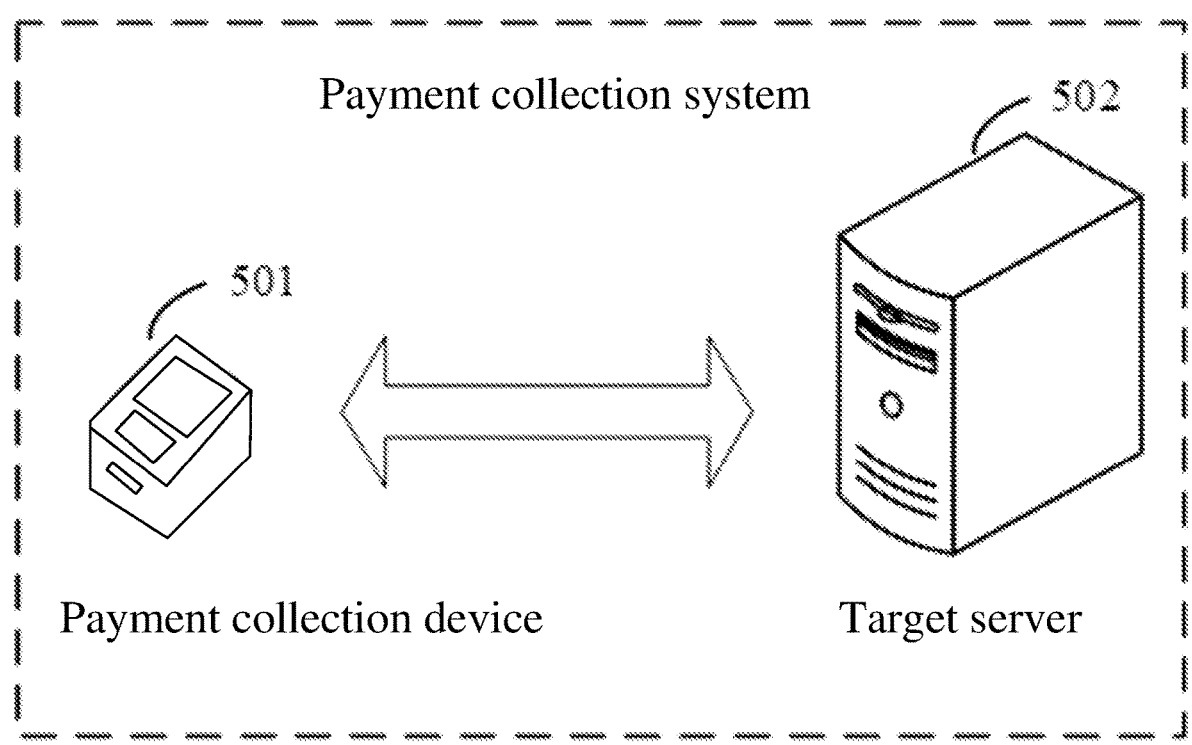
FIG. 5 is a schematic structural diagram of a payment collection system, according to an embodiment of the specification.

Based on the payment collection method shown in FIG. 2, an embodiment of the specification further correspondingly provides a payment collection system shown in FIG. 5 including a payment collection device 501 and a target server 502 as previously described.

The target server 502 stores an association relationship between a device identifier of the payment collection device 501 and a payment receiving account of the merchant. The payment receiving account being managed by the target server 502.

The payment collection device 501 acquires a payment amount to be collected; scans a payment code provided by a purchasing user, to obtain payment account information contained in the payment code, a payment account corresponding to the payment account information being managed by the target server; constructs a payment collection request containing the payment amount to be collected, the payment account information, and the device identifier; and sends the payment collection request to the target server 502.

According to the payment collection request, the target server 502 deducts, from the payment account corresponding to the payment account information, the payment amount to be collected, and adds, to the payment receiving account associated with the device identifier, the payment amount to be collected.

Based on the payment collection method shown in FIG. 2, an embodiment of the specification further provides a device binding method shown in FIG. 6, including steps below.

S600: The payment collection device scans a configuration code that is provided by a merchant and that contains payment receiving account information corresponding to a payment receiving account of the merchant, to obtain the payment receiving account information. The payment receiving account is managed by the target server.

In some embodiments, the code scanner is configured to obtain payment receiving account information corresponding to a payment receiving account of a seller by scanning a configuration code of the seller, and to send the payment receiving account information to the processor, the configuration code comprising the payment receiving account information.

S602: The payment collection device constructs a device binding request containing the payment receiving account information and the device identifier. In some embodiments, the processor is configured to construct a device binding request comprising the payment receiving account information and a device identifier of the payment collection device, and to send the device binding request to the communication module.

S604: The payment collection device sends the device binding request to the target server.

S606: The target server establishes an association relationship between the payment receiving account information and the device identifier and stores the association relationship. In some embodiments, the communication module is configured to send the device binding request to a target server, for the target server to establish and store an association relationship between the device identifier and the payment receiving account information.

Figure 6:
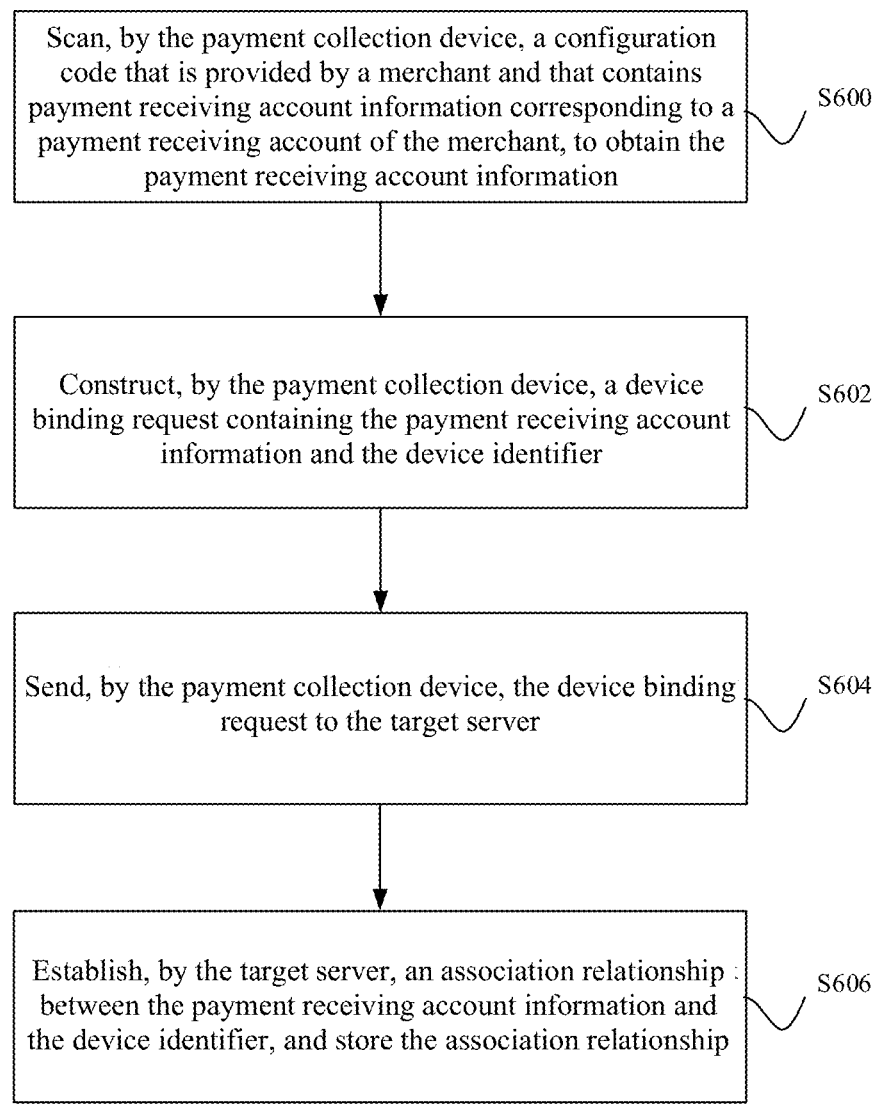
FIG. 6 is a schematic flowchart of a device binding method, according to an embodiment of the specification.
Figure 7:
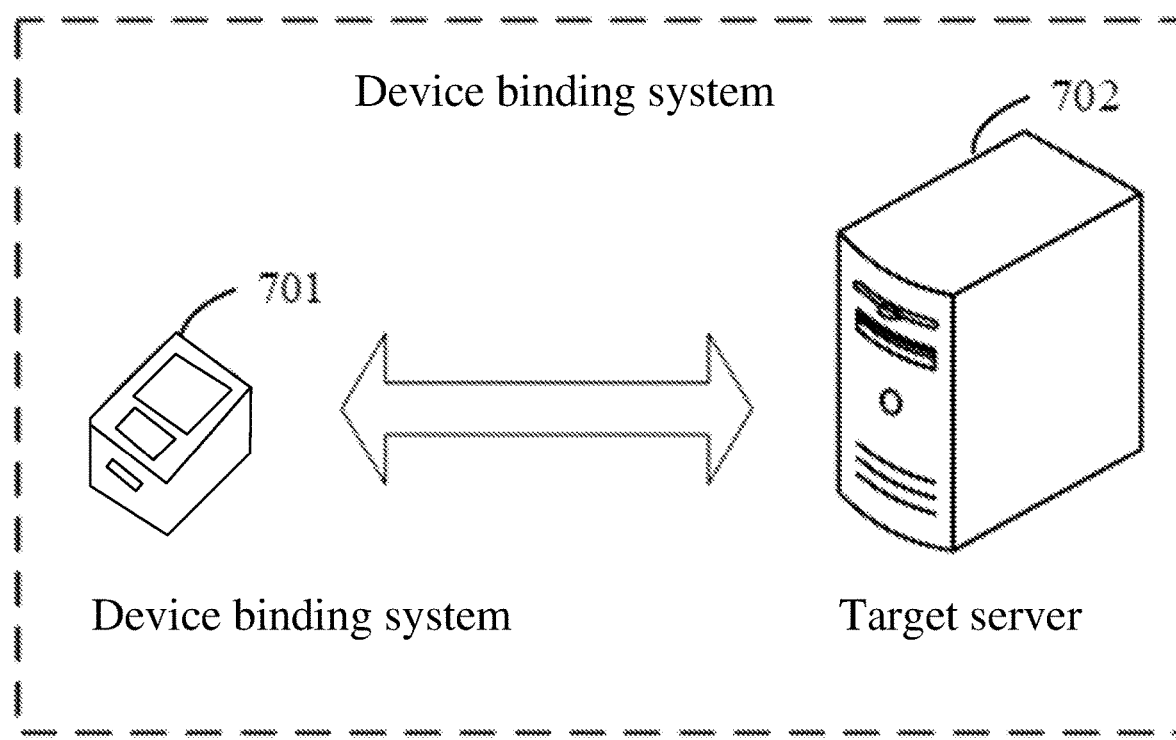
FIG. 7 is a schematic structural diagram of a device binding system, according to an embodiment of the specification.

Based on the device binding method shown in FIG. 6, a device binding system provided by an embodiment of the specification shown in FIG. 7 includes: a payment collection device 701 and a target server 702 as previously described.

The payment collection device 701 scans a configuration code that is provided by a merchant and that contains payment receiving account information corresponding to a payment receiving account of the merchant, to obtain the payment receiving account information, the payment receiving account being managed by the target server; constructs a device binding request containing the payment collection information and the device identifier; and sends the device binding request to the target server 702.

The target server 702 establishes an association relationship between the payment receiving account information and the device identifier and stores the association relationship.

Figure 8:
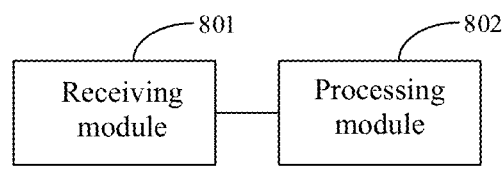
FIG. 8 is a schematic structural diagram of a payment collection apparatus, according to an embodiment of the specification.

Based on the payment collection method shown in FIG. 2, an embodiment of the specification provides a payment collection apparatus. As shown in FIG. 8, the apparatus stores an association relationship between a device identifier of the payment collection apparatus and a payment receiving account of a merchant. The payment receiving account is managed by the apparatus. The apparatus includes the following: a receiving module 801 configured to receive a payment collection request that is sent by the payment collection device and that contains a payment amount to be collected, payment account information, and the device identifier; the payment amount to be collected being obtained by the payment collection device, the payment account information being obtained by the payment collection device scanning a payment code provided by a purchasing user, and a payment account corresponding to the payment account information being managed by the apparatus; and a processing module 802 configured, according to the payment collection request, to deduct, from the payment account corresponding to the payment account information, the payment amount to be collected, and add, to a payment receiving account associated with the device identifier, the payment amount to be collected.

An embodiment of the specification further provides a computer device including at least a memory, a processor, and a computer program stored on the memory and executable on the processor. The target server stores an association relationship between the device identifier of the computer device and a payment receiving account of the merchant, the payment collection being managed by the target server.

The processor implements a method below while executing the program: a payment amount to be collected is acquired; a payment code provided by a purchasing user is scanned, to obtain payment account information contained in the payment code, a payment account corresponding to the payment account information being managed by the target server; a payment collection request containing the payment amount to be collected, the payment account information, and the device identifier are constructed; and the payment collection request is sent to the target server for the target server to, according to the payment collection request, deduct, from the payment account corresponding to the payment account information, the payment amount to be collected, and add, to the payment receiving account associated with the device identifier, the payment amount to be collected.

An embodiment of the specification also provides another computer device including at least a memory, a processor, and a computer program stored on the memory and executable on the processor. The computer device stores an association relationship between a device identifier of a payment collection device and a payment receiving account of a merchant, the payment receiving account being managed by the computer device.

The processor implements a method below while executing the program: receiving a payment collection request that is sent by the payment collection device and that contains a payment amount to be collected, payment account information, and the device identifier; the payment amount to be collected being obtained by the payment collection device, the payment account information being obtained by the payment collection device scanning a payment code provided by a purchasing user, and a payment account corresponding to the payment account information being managed by the computer device; and according to the payment collection request, deducting, from the payment account corresponding to the payment account information, the payment amount to be collected and adding, to a payment receiving account associated with the device identifier, the payment amount to be collected.

The foregoing two computer devices may have a same hardware structure.

Figure 9:
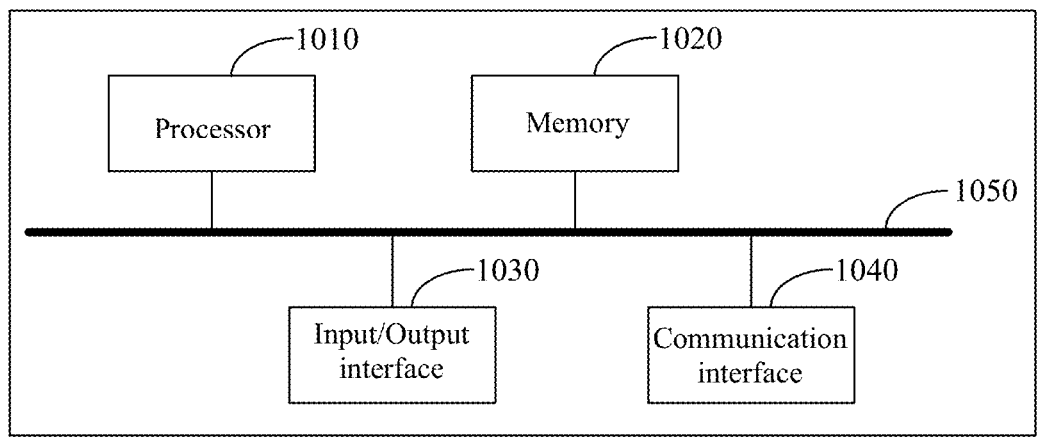
FIG. 9 is a schematic structural diagram of a computer device configured for an embodiment method of the specification.

FIG. 9 is a schematic diagram of a detailed hardware structure of a computing device according to an embodiment of the present application. The device may include: a processor 1010, a memory 1020, an input/output interface 1030, a communication interface 1040, and a bus 1050. Communication connection between the processor 1010, the memory 1020, the input/output interface 1030, and the communication interface 1040 in the device is implemented through the bus 1050.

The processor 1010 may be implemented by a general-purpose central processing unit (CPU), a microprocessor, an application-specific integrated circuit (ASIC), or one or more integrated circuits to execute a related program, to implement the technical solution provided in the embodiments of the present application.

The memory 1020 may be implemented by a read only memory (ROM), a random access memory (RAM), a static storage device, or a dynamic storage device. The memory 1020 may store an operating system and other application programs. When the technical solutions provided in the embodiments of the present application are implemented by software or firmware, relevant program code is stored in the memory 1020 and is called and executed by the processor 1010.

The input/output interface 1030 is used to connect an input/output module to implement information input and output. The input/output module may be configured in the device (not shown in the figure) as a component, or may be externally connected to the device to provide corresponding functions. The input device may include a keyboard, a mouse, a touch screen, a microphone, various sensors, and the like, and the output device may include a display, a speaker, a vibrator, an indicator light, and the like.

The communication interface 1040 is used to connect a communication module (not shown in the figure) to implement communication interaction between the device and other devices. The communication module may implement communication in a wired manner (for example, a Universal Serial Bus (USB) or a network cable), and may also implement communication in a wireless manner (for example, mobile network, Wireless Fidelity (WI-FI) or Bluetooth).

The bus 1050 includes a channel, and transmits information between components (such as the processor 1010, the memory 1020, the input/output interface 1030, and the communications interface 1040) of the device.

Although only the processor 1010, the memory 1020, the input/output interface 1030, the communication interface 1040, and the bus 1050 are shown for the above device, the device may further include other components necessary for implementing normal operation. In addition, a person skilled in the art can understand that the above device may include only components necessary to implement the solutions of the embodiments of the present application and does not necessarily include all the components shown in the drawings.

An embodiment of the specification further provides a computer-readable storage medium storing a computer program. The computer program, when executed by a processor, implements the payment collection method shown in FIG. 2.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

In addition, the present application further provides an aggregated payment collection device. Each target server in a plurality of target servers stores an association relationship between a device identifier of the aggregated payment collection device and a payment receiving account that is of the merchant and that is managed by the target server.

The payment collection device includes: a code scanner, a processor, and a communication module.

The code scanner scans a payment code provided by a purchasing user to obtain payment account information contained in the payment code; and sends the payment account information to the processor.

The processor determines a server identifier and a payment amount to be collected in the payment account information, constructs a payment request containing the payment amount to be collected, the payment account information, and the device identifier, and sends the payment request and the server identifier to the communication module.

The communication module sends the payment request to a target server corresponding to the server identifier, for the target server corresponding to the server identifier, according to the payment request, to deduct, from a payment account corresponding to the payment account information, the payment amount to be collected, and add, to a payment receiving account associated with the device identifier, the payment amount to be collected.

Based on the foregoing aggregated payment collection device, an aggregated payment collection method is further provided. Each target server in a plurality of target servers stores an association relationship between the device identifier of the aggregated payment collection device and the payment collection device that is of the merchant and that is managed by the target server.

The method includes the following.

The aggregated payment collection device acquires a payment amount to be collected.

The aggregated payment collection device scans a payment code provided by the purchasing user to obtain payment account information contained in the payment code.

The aggregated payment collection device determines a server identifier contained in the payment account information.

The aggregated payment collection device constructs a payment request containing the payment amount to be collected, the payment account information, and the device identifier, and sends the payment request to a target server corresponding to the server identifier.

According to the payment collection request, the target server corresponding to the server identifier deducts, from the payment account corresponding to the payment account information, the payment amount to be collected, and adds, to the payment receiving account associated with the device identifier, the payment amount to be collected.

It may be learned from description of the foregoing implementations that, a person skilled in the art may clearly understand that the embodiments of the present application may be implemented by using software in addition to a necessary universal hardware platform. Based on such an understanding, the technical solutions in the embodiments of the present application essentially, or the part contributing to the existing technologies may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present application.

The system, the method, the module or the unit described in the foregoing embodiments can be specifically implemented by a computer chip or an entity or implemented by a product having a certain function. A typical implementation device is a computer, and the specific form of the computer may be a personal computer, a laptop computer, a cellular telephone, a camera phone, a smartphone, a personal digital assistant, a media player, a navigation device, an email transceiver device, a game console, a tablet computer, a wearable device, or a combination thereof.

The embodiments in this specification are all described in a progressive manner, for same or similar parts in the embodiments, refer to these embodiments, and descriptions of each embodiment focus on a difference from other embodiments. Especially, apparatus and device embodiments are basically similar to a method embodiment, and therefore are described briefly; for related parts, refer to partial descriptions in the method embodiment. The method embodiment described above is merely exemplary, and the modules described as separate components may or may not be physically separate. When the solutions of the embodiments of the present application are implemented, the functions of the modules may be implemented in one same piece or a plurality of pieces of software and/or hardware. Some or all modules thereof may be selected based on an actual requirement, to implement an objective of the solution in this embodiment. A person of ordinary skill in the art may understand and implement the objective without creative efforts.

The foregoing is only specific implementations of the embodiments of the present application, it shall be pointed out that, a person of ordinary skill in the art may further make various improvements and embellishments without departing from the principles of the embodiments of the present application. Such improvements and embellishments shall fall within the protection scope of the embodiments of the present application.

What is claimed is:

1. A point of sale (POS) payment collection device, comprising: a processor, a code scanner coupled to the processor, and a communication module coupled to the processor, wherein:
   the code scanner is configured to obtain payment receiving account information corresponding to a payment receiving account of a seller by scanning a configuration code of the seller, and to send the payment receiving account information to the processor, the configuration code comprising the payment receiving account information;

the processor is configured to construct a device binding request comprising the payment receiving account information and a device identifier of the POS payment collection device, and to send the device binding request to the communication module;

the communication module is configured to directly communicate with a target server to send the device binding request to the target server that establishes and stores, based on the device binding request, an association relationship between the device identifier and the payment receiving account information;

the code scanner is configured to obtain payment account information comprised in a payment code of a purchasing user by scanning the payment code, and to send the payment account information to the processor;

the processor is configured to determine a payment amount due, to construct a payment request comprising the payment amount due, the payment account information, and the device identifier, and to send the payment request to the communication module; and the communication module is configured to directly communicate with the target server to send the payment request to the target server that deducts, according to the payment request, the payment amount due from a payment account of the purchasing user corresponding to the payment account information, and adds the payment amount due to the payment receiving account corresponding to the device identifier.

2. The device according to claim 1, wherein:

the communication module comprises a wireless fidelity module;

the configuration code further comprises wireless fidelity hotspot information;

the code scanner is configured to obtain the wireless fidelity hotspot information and send the wireless fidelity hotspot information to the wireless fidelity module; and the wireless fidelity module is configured to connect to a wireless fidelity hotspot corresponding to the wireless fidelity hotspot information according to the wireless fidelity hotspot information, for direct communication with the target server through the wireless fidelity hotspot.

3. The POS payment collection device according to claim 1, wherein the POS payment collection device further comprises an information input module configured to receive the payment amount due input by the seller, and to send the payment amount due to the processor.

4. The POS payment collection device according to claim 1, wherein:

the code scanner is configured to obtain merchandise information of a merchandise purchased with the payment amount by scanning a merchandise code that comprises the merchandise information, and to send the merchandise information to the processor;

the processor is configured to construct a merchandise price query request comprising the merchandise information, and to send the merchandise price query request to the communication module; and the communication module is configured to send the merchandise price query request to the target server, to receive from the target server a merchandise price corresponding to the merchandise information, and to send the merchandise price to the processor as the payment amount due.

5. The POS payment collection device according to claim 1, wherein:

the code scanner is configured to obtain a payment record identifier comprised in a payment record identification code of the purchasing user by scanning the payment record identification code, and to send the payment record identifier to the processor;

the payment record identification code is generated by the target server and issued to the purchasing user according to a payment record after the target server generates the payment record according to the payment request;

the processor is configured to construct a refund request comprising the payment record identifier, and to send the refund request to the communication module; and the communication module is configured to directly communicate with the target server to send the refund request to the target server, for the target server to determine, according to the refund request, the payment receiving account, the payment account, and the payment amount due in the payment record corresponding to the payment record identifier, deduct the payment amount due from the payment receiving account, and add the payment amount due to the payment account.

6. The POS payment collection device according to claim 1, wherein:

the code scanner is configured to obtain a payment record identifier comprised in a payment record identification code of the purchasing user by scanning the payment record identification code, and to send the payment record identifier to the processor;

the payment record identification code is generated by the target server and issued to the purchasing user according to a payment record after the target server generates the payment record according to the payment request;

the processor is configured to construct a payment record query request comprising the payment record identifier, and to send the payment record query request to the communication module; and the communication module is configured to directly communicate with the target server to send the payment record query request to the target server, for the target server to return the payment record corresponding to the payment record identifier according to the payment record query request.

7. The POS payment collection device according to claim 1, wherein the POS payment collection device further comprises: a security element configured to encrypt and sign information sent to the target server.

8. The POS payment collection device according to claim 1, wherein:

the POS payment collection device further comprises: an audio output module;

the processor is configured to determine an audio message according to a preset rule, and to send the audio message to the audio output module; and the audio output module is configured to play the audio message.

9. A non-transitory computer-readable storage medium storing instructions executable by a processor of a point-of-sale (POS) payment collection device, wherein execution of the instructions causes the processor to perform operations comprising:

obtaining, at a code scanner of the POS payment collection device, payment receiving account information corresponding to a payment receiving account of a seller by scanning a configuration code of the seller;

sending, at the code scanner, the payment receiving account information to the processor, the configuration code comprising the payment receiving account information;

constructing, at the processor, a device binding request comprising the payment receiving account information and a device identifier of the payment collection device;

sending, at the processor, the device binding request to a communication module of the POS collection device;

sending, at the communication module, by directly communicating with a target server, the device binding request to the target server for the target server to establish and store, based on the device binding request, an association relationship between the device identifier and the payment receiving account information;

obtaining, at the code scanner, payment account information comprised in a payment code of a purchasing user by scanning the payment code;

sending, at the code scanner, the payment account information to the processor;

determining, at the processor, a payment amount due, to construct a payment request comprising the payment amount due, the payment account information, and the device identifier;

sending, at the processor, the payment request to the communication module; and sending, at the communication module, by directly communicating with the target server, the payment request to the target server for the target server to, according to the payment request, deduct the payment amount due from a payment account of the purchasing user corresponding to the payment account information, and add the payment amount due to the payment receiving account corresponding to the device identifier.

10. The non-transitory computer-readable storage medium according to claim 9, wherein:
the communication module comprises a wireless fidelity module;
the configuration code further comprises wireless fidelity hotspot information; and
before sending the device binding request to the target server, the operations further comprise:
obtaining, at the code scanner, the wireless fidelity hotspot information;
sending, at the code scanner, the wireless fidelity hotspot information to the wireless fidelity module; and
connecting, at the wireless fidelity module, to a wireless fidelity hotspot corresponding to the wireless fidelity hotspot information according to the wireless fidelity hotspot information, for direct communication with the target server through the wireless fidelity hotspot.

11. The non-transitory computer-readable storage medium according to claim 9, wherein before determining the payment amount due, the operations further comprise:
receiving, at an information input module, the payment amount due input by the seller; and
sending, at the information input module, the payment amount due to the processor.

12. The non-transitory computer-readable storage medium according to claim 9, wherein before obtaining the payment receiving account information corresponding to the payment receiving account of the seller, the operations further comprise:

obtaining, at the code scanner, merchandise information of a merchandise purchased with the payment amount by scanning a merchandise code that comprises the merchandise information;

sending, at the code scanner, the merchandise information to the processor;

constructing, at the processor, a merchandise price query request comprising the merchandise information;

sending, at the processor, the merchandise price query request to the communication module;

sending, at the communication module, the merchandise price query request to the target server, to receive from the target server a merchandise price corresponding to the merchandise information; and sending, at the communication module, the merchandise price to the processor as the payment amount due.

13. The non-transitory computer-readable storage medium according to claim 9, wherein the operations further comprise:
obtaining, at the code scanner, a payment record identifier comprised in a payment record identification code of the purchasing user by scanning the payment record identification code;
sending, at the code scanner, the payment record identifier to the processor;
the payment record identification code is generated by the target server and issued to the purchasing user according to a payment record after the target server generates the payment record according to the payment request;
constructing, at the processor, a refund request comprising the payment record identifier;
sending, at the processor, the refund request to the communication module; and
sending, at the communication module, the refund request to the target server, for the target server to determine, according to the refund request, the payment receiving account, the payment account, and the payment amount due in the payment record corresponding to the payment record identifier, deduct the payment amount due from the payment receiving account, and add the payment amount due to the payment account.

14. The non-transitory computer-readable storage medium according to claim 9, wherein the operations further comprise:
obtaining, at the code scanner, a payment record identifier comprised in a payment record identification code of the purchasing user by scanning the payment record identification code;
sending, at the code scanner, the payment record identifier to the processor;
the payment record identification code is generated by the target server and issued to the purchasing user according to a payment record after the target server generates the payment record according to the payment request;
constructing, at the processor, a payment record query request comprising the payment record identifier;
sending, at the processor, the payment record query request to the communication module; and
sending, at the communication module, the payment record query request to the target server, for the target server to return the payment record corresponding to the payment record identifier according to the payment record query request.

15. A method, comprising:
obtaining, at a code scanner of a point-of-sale (POS) payment collection device, payment receiving account information corresponding to a payment receiving account of a seller by scanning a configuration code of the seller;

sending, at the code scanner, the payment receiving account information to a processor of the POS payment collection device, the configuration code comprising the payment receiving account information;

constructing, at the processor, a device binding request comprising the payment receiving account information and a device identifier of the POS payment collection device;

sending, at the processor, the device binding request to a communication module of the POS payment collection device;

sending, at the communication module, by directly communicating with a target server, the device binding request to the target server for the target server to establish and store, based on the device binding request, an association relationship between the device identifier and the payment receiving account information;

obtaining, at the code scanner, payment account information comprised in a payment code of a purchasing user by scanning the payment code;

sending, at the code scanner, the payment account information to the processor;

determining, at the processor, a payment amount due, to construct a payment request comprising the payment amount due, the payment account information, and the device identifier;

sending, at the processor, the payment request to the communication module; and sending, at the communication module, by directly communicating with the target server, the payment request to the target server for the target server to, according to the payment request, deduct the payment amount due from a payment account of the purchasing user corresponding to the payment account information, and add the payment amount due to the payment receiving account corresponding to the device identifier.

16. The method according to claim 15, wherein:
the communication module comprises: a wireless fidelity module;
the configuration code further comprises wireless fidelity hotspot information; and
before sending the device binding request to the target server, the method further comprises:
obtaining, at the code scanner, the wireless fidelity hotspot information;
sending, at the code scanner, the wireless fidelity hotspot information to the wireless fidelity module; and
connecting, at the wireless fidelity module, to a wireless fidelity hotspot corresponding to the wireless fidelity hotspot information according to the wireless fidelity hotspot information, for direct communication with the target server through the wireless fidelity hotspot.

17. The method according to claim 15, wherein before determining the payment amount due, the method further comprises:
receiving, at an information input module, the payment amount due input by the seller; and
sending, at the information input module, the payment amount due to the processor.

18. The method according to claim 15, wherein before obtaining the payment receiving account information corresponding to the payment receiving account of the seller, the method further comprises:
obtaining, at the code scanner, merchandise information of a merchandise purchased with the payment amount by scanning a merchandise code that comprises the merchandise information;
sending, at the code scanner, the merchandise information to the processor;
constructing, at the processor, a merchandise price query request comprising the merchandise information;
sending, at the processor, the merchandise price query request to the communication module;
sending, at the communication module, the merchandise price query request to the target server, to receive from the target server a merchandise price corresponding to the merchandise information; and
sending, at the communication module, the merchandise price to the processor as the payment amount due.

19. The method according to claim 15, further comprising:
obtaining, at the code scanner, a payment record identifier comprised in a payment record identification code of the purchasing user by scanning the payment record identification code;
sending, at the code scanner, the payment record identifier to the processor;
the payment record identification code is generated by the target server and issued to the purchasing user according to a payment record after the target server generates the payment record according to the payment request;
constructing, at the processor, a refund request comprising the payment record identifier;
sending, at the processor, the refund request to the communication module; and
sending, at the communication module, the refund request to the target server, for the target server to determine, according to the refund request, the payment receiving account, the payment account, and the payment amount due in the payment record corresponding to the payment record identifier, deduct the payment amount due from the payment receiving account, and add the payment amount due to the payment account.

20. The method according to claim 15, further comprising:
obtaining, at the code scanner, a payment record identifier comprised in a payment record identification code of the purchasing user by scanning the payment record identification code;
sending, at the code scanner, the payment record identifier to the processor;
the payment record identification code is generated by the target server and issued to the purchasing user according to a payment record after the target server generates the payment record according to the payment request;
constructing, at the processor, a payment record query request comprising the payment record identifier;
sending, at the processor, the payment record query request to the communication module; and
sending, at the communication module, the payment record query request to the target server, for the target server to return the payment record corresponding to the payment record identifier according to the payment record query request.

* * * * *